United States Patent [19]

Zinchuk

[11] 4,310,227
[45] Jan. 12, 1982

[54] DIFFRACTED ENERGY AUTO-RANGING SYSTEM FOR A CAMERA

[75] Inventor: Michael Zinchuk, Waltham, Mass.

[73] Assignee: Polaroid Corporation, Cambridge, Mass.

[21] Appl. No.: 222,503

[22] Filed: Jan. 5, 1981

[51] Int. Cl.³ .............................................. G03B 3/00
[52] U.S. Cl. ...................................... 354/25; 354/59; 356/4
[58] Field of Search ..................... 354/25, 59; 352/140; 355/56; 356/4

[56] References Cited

U.S. PATENT DOCUMENTS

| | | |
|---|---|---|
| 3,898,676 | 8/1975 | Machida et al. ....................... 354/25 |
| 3,936,187 | 2/1976 | Momose ................................. 356/1 |
| 4,004,852 | 1/1977 | Pentecost .............................. 356/1 |
| 4,059,758 | 11/1977 | Wilwerding ......................... 250/201 |
| 4,065,778 | 12/1977 | Harney ................................ 354/25 |
| 4,123,650 | 10/1978 | Hosoe ................................. 250/201 |
| 4,178,098 | 12/1979 | Asano et al. ........................... 356/1 |
| 4,185,191 | 1/1980 | Stauffer ............................... 250/204 |

OTHER PUBLICATIONS

"Optics" by Hecht, E. & Zajcce, A., (Addison–Wesley Pub. Co., 1974), pp. 354–358.
Bell Tele. Sys. Monograph B–1654, by G. W. Willard, Pub. in Journal of the Acoustical Society of Am., vol. 21, pp. 101–108, Mar. 1949.

Primary Examiner—Michael L. Gellner
Attorney, Agent, or Firm—Edward S. Roman

[57] ABSTRACT

An infra-red auto-ranging system for a photographic camera or the like includes a ranging sensor that directs a portion of the light energy from the subject of principal interest through a diffraction device that diffracts the radiation into central and higher order spectral lines that are then passed through an infra-red filter. An infra-red responsive sensor, such as a photo-responsive reticon array, is positioned to receive the radiation from a selected one of the spectral lines with the position of the imaged spectral energy on the sensor varying as a function of the angle of incidence of the light from the subject and of the range to the subject. The diffraction device may take the form of a conventional transmission-type diffraction grating, a replica, or an acous-to/optical diffraction cell responsive to an excitation energy source. Computing circuitry is provided to determine the range to the subject of principal interest as a function of the position that the selected spectral line images on the sensor. By appropriate selection of the diffraction characteristics of the diffraction device, it is possible to limit the width of the selected spectral line to a narrowly defined physical limit to enhance the resolution of the ranging determination.

21 Claims, 6 Drawing Figures

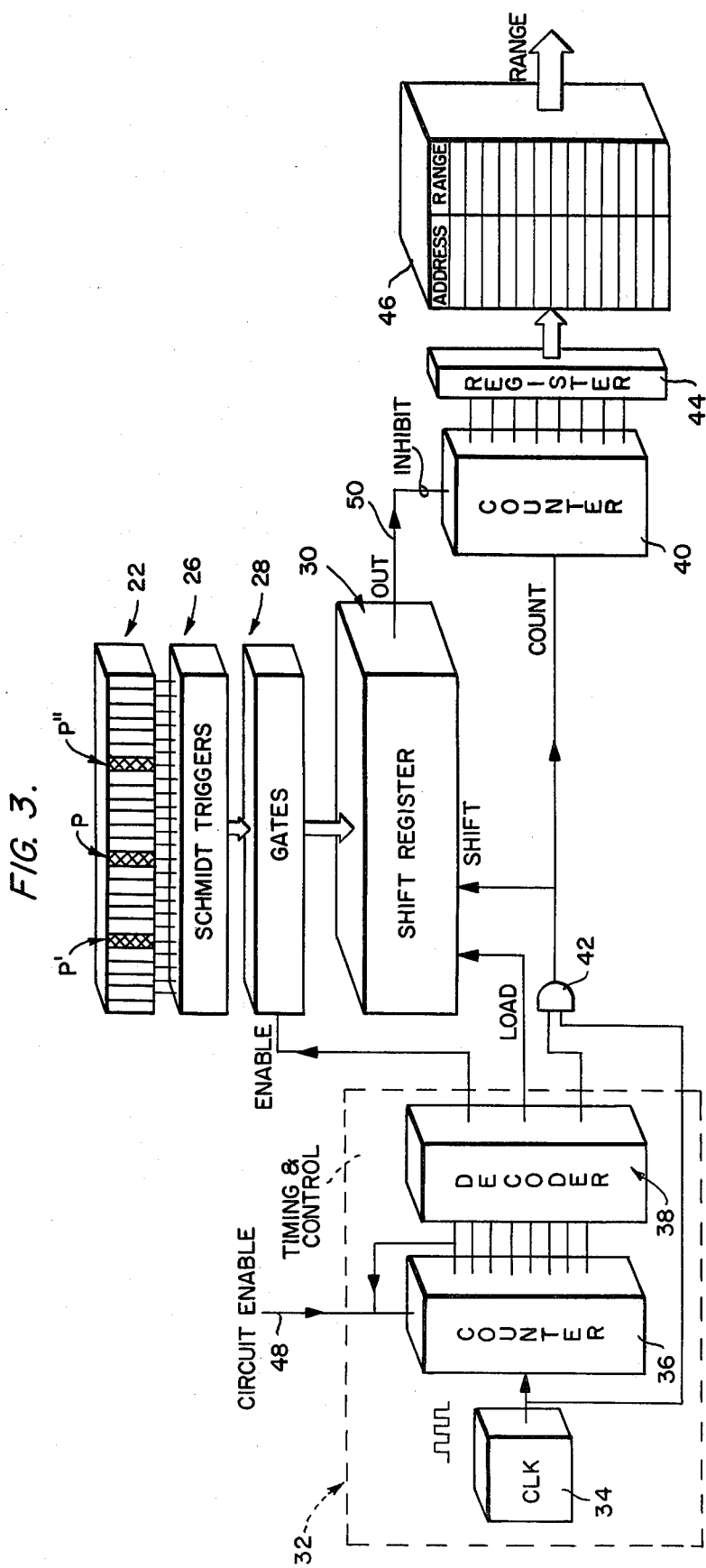

DIFFRACTED ENERGY AUTO-RANGING SYSTEM FOR A CAMERA

CROSS REFERENCE TO RELATED APPLICATION

The disclosure of this application is related to the subject matter of copending U.S. Patent application Ser. No. 211,639 filed by C. Biber on Dec. 1, 1980 and entitled "Infrared Camera Ranging System."

BACKGROUND OF THE INVENTION

The present invention relates to an auto ranging apparatus for use with photographic cameras or the like for determining the distance-to-subject range and, more particularly, to an auto ranging system that utilizes diffracted radiation either emitted by or reflected from the subject of principal interest for accurately determining the distance-to-subject range.

Motion picture and still picture cameras are typically focused by manual adjustment of the camera lens while viewing a focus indicator such as the split/image screen on the so-called range-finder cameras and the focusing screen provided in single-lens-reflex camera. Automatic or auto ranging focusing systems have been developed which permit the camera to auto range, that is, determine the distance-to-subject range without the intervention of a camera operator. These automatic systems have typically utilized radiation that is either emitted by or reflected from the subject of principal interest. The radiation, which may be in the visible or infra-red light range, is typically focused on a radiation responsive sensor or sensors with the relative position of the focused image on a sensor or the positional coincidence between the focused images on plural sensors used as a basis for determining the distance-to-subject range. As a practical matter, the radiation responsive sensors are typically of small physical size (e.g., 5 mm. on a side). Since the distance-to-subject range is dependent upon the position that the focused energy from the subject falls on the comparatively small sensor(s), it is important that the focusing be relatively sharp to provide acceptable accuracy in the range determination. While prior systems have been developed which provide adequate ranging information, the resolution of these prior systems has been limited by the practical need for physically compact ranging sensors.

SUMMARY OF THE INVENTION

In view of the above, it is a primary object of the present invention, among others, to provide an auto-ranging system for still or motion picture cameras which quickly and accurately determines the distance-to-subject range.

It is another object of the present invention to provide an auto-ranging system for a camera in which the distance-to-subject range is determined by utilizing radiant energy that is emitted by or reflected from the subject of principal interest in the scene to be photographed.

It is still another object of the present invention to provide a high resolution auto-ranging system for a camera for accurately determining the distance-to-subject range by diffracting a portion of the energy emitted by or reflected from the subject and utilizing a selected spectral line to effect the ranging determination.

In accordance with these objects, and others, the present invention provides an auto-ranging system for a still or motion picture camera or the like in which radiation emitted by or reflected from the subject of principal interest in the scene to be photographed is divided by a diffraction device into spectral maximas or lines with a selected maxima directed toward a radiation responsive sensor. The relative position of the imaged maxima on the radiation responsive sensor is a function of the angle of incidence of the energy from the subject of principal interest and the distance-to-subject range. In the preferred embodiment, a multi-segmented radiation responsive sensor is secured to the camera body a selected distance from the camera view finder. Radiation from the subject of principal interest is directed through a diffraction grating and diffracted into a central maxima (zero order) and other order maximas ($n = 1, 2, \ldots$) on either side of the central maxima. The diffracted energy is filtered through an infra-red filter with a selected one of the maximas (e.g., a first order maxima) projected onto the surface of the radiation responsive sensor. The relative position of the so-projected maxima is a function of the distance to the subject of principal interest from the camera. Computing cicuitry ascertains the relative position of the imaged maxima and computes the distance to the subject as a function of the known optical characteristics of the ranging sensor and the camera. The diffraction device may take the form of a transmission type diffraction grating, a replica, or an acousto/optical diffraction cell coupled to a suitable excitation source.

By subjecting the energy reflected from or emitted by the subject of principal interest to diffraction and by selecting a suitable grating spacing, it is possible to generate comparitively bright, narrow maximas to permit improved resolution of the imaged energy on the sensor and likewise improve the accuracy of the distance-to-subject range determination.

BRIEF DESCRIPTION OF THE DRAWINGS

FIG. 3 is a schematic diagram in functional block form of a computing circuit for determining the distance-to-subject range in accordance with the ranging geometry shown in FIG. 1.

DESCRIPTION OF THE PREFERRED EMBODIMENT

Figure 1:
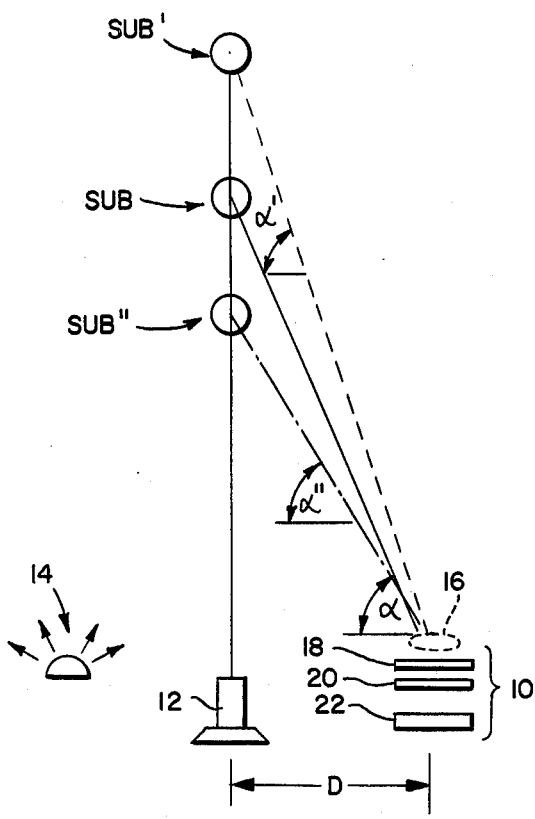
FIG. 1 schematically illustrates the ranging geometry of a preferred embodiment of a ranging sensor of the present invention when ranging on a subject of principal interest.

An auto-ranging system in accordance with the present invention for motion and still picture photographic cameras and the like is illustrated in FIGS. 1–3 with FIG. 1 illustrating the ranging geometry and FIGS. 2–3 illustrating the ranging sensor characteristics and circuitry for effecting the distance-to-subject range determination. As shown in FIG. 1, a ranging sensor 10 is secured to the camera body (not shown) a selected distance 'D' from the camera view finder 12 and preferably oriented so that its optical axis is substantially parallel to that of the view finder 12. The view finder 12 is used in a conventional manner by the camera operator to aim the camera in the direction of the scene to be photographed and frame the subject of principal interest SUB within a designated area in the field of view. When the camera is so aimed, light energy from the subject SUB is received by and enters the ranging sensor 10 at an angle of incidence that is a function of the distance-to-subject range and the dimension 'D' between the view finder 12 and the ranging sensor D. As is evident from the solid and broken line rays in FIG. 1, radiation from the subject SUB will enter the ranging system 10 at a first angle $\alpha$, radiation from a second subject SUB' positioned at a greater distance than the subject SUB will enter the ranging sensor 10 at a second angle $\alpha'$ that is larger than the angle $\alpha$, and radiation from a third subject SUB" positioned at a shorter distance than the subject SUB will enter the ranging sensor 10 at a third angle $\alpha''$ that is smaller than the angle $\alpha$.

The system may be either passive or active in that the light energy from the subject that is utilized to effect the ranging determination may be energy that is emitted by the subject, such as warm-body infra-red radiation, or reflected energy, such as energy that is reflected from the subject as a consequence of radiation provided by a radiation source 14 that is mounted on the camera body and adapted to irradiate the field of view.

The ranging sensor 10 includes a lens or lenses 16 (broken line illustration) that collects a portion of the radiation emitted (in a passive system) or reflected (in an active system) from the subject of principal interest and directs this collected energy through a transmission-type diffraction grating 18 or similar device (described in greater detail below) with the grating diffracting the collected radiant energy into narrow, spectral lines or maximas including a central maxima (zero order maxima) and at least two first order maximas (+1 and −1 order maximas) in a known manner, as described for example, in the text 'Optics' by Hecht, E. and Zajac, A. (Addison-Wesley Pub. Co., 1974) pp. 354–358. The diffracted light energy is then passed through a filter 20 which passes only that portion of the diffracted energy that occupies a selected frequency range, for example, the infra-red range. As shown in greater detail in FIG. 2A, the diffraction device 18 may take the form of a ruled glass plate, or, more preferably, a transparent plastic replica thereof, having recurring grooves at a grating spacing 'd'. In an alternative form, the diffraction 18 device may take the form of a photographically formed grating having recurring slits at the grating spacing 'd'. The groove or slit density is selected so that it is sufficient to diffract the incident radiation into a central or zero order maxima and at least two first order maximas (n=+1 and n=−1) with these maximas being relatively narrow and bright. An exemplary groove or slit density is approximately $10^3$ lines per cm. As is known in the art, the exit angle of any one of the maximas is dependent upon and a function of the angle of incidence $\alpha$ of the incident radiation. As shown by the broken line rays on each side of the n=−1 maxima in FIG. 2, variations in the angle $\alpha$ of the incident radiation will cause a similar and corresponding variation in the exit angle of the selected maxima.

Figure 2A:
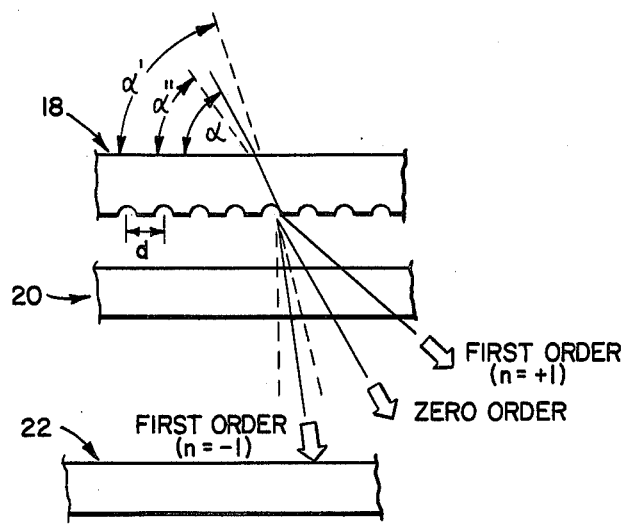
FIG. 2A illustrates a ray diagram of the ranging sensor of FIG. 1 showing the manner in which the radiation emitted by or reflected from the subject of principal interest is diffracted.
Figure 2B:
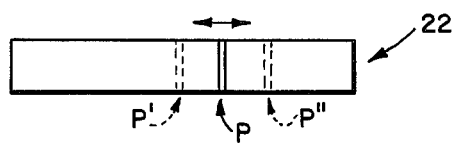
FIG. 2B illustrates the variation in position of the image of a selected spectral line on the radiation receiving surface of the ranging sensor shown in FIG. 1 as a function of the distance-to-subject range.

A photo responsive array 22 is positioned behind the filter 20 and is so adjusted in terms of its length and position to be irradiated by a selected one of the spectral maximas, with the imaged spectra on the photo responsive array 22 forming a narrow bright line as is known in the art. As can be likewise appreciated from the foregoing, the position of the so-imaged spectral line on the photo array 22 is a function of the angle of incidence of the incident radiation from the subject of principal interest, which angle $\alpha$, in turn, is a function of the distance-to-subject range as shown in FIG. 1. In FIGS. 2A and 2B, the first order spectral line n=−1 has been selected for use in effecting the ranging determination. As shown in FIG. 2B, the image of the selected n=−1 spectral line occupies an intermediate position P for subjects at an intermediate range, a more leftward position P' for subjects at a greater range and a more rightward position P" for subjects at a close range. In the system, the optical characteristics of the diffraction grating 18 and its location and spacing relative to the photo responsive array 22 are arranged so that the selected spectral line is desirably narrow to permit a high degree of resolution in the ranging determination.

Figure 2C:
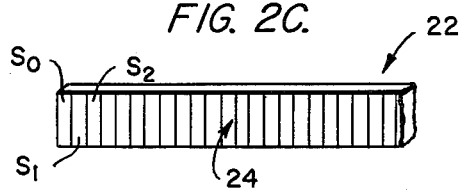
FIG. 2C is a partial illustration of the radiation receiving face of the sensor shown in FIG. 2B showing a plurality of serially aligned radiation responsive segments.

As shown in FIG. 2C, the photo responsive array 22 has a radiation receiving surface 24 that is divided into multiple vertically aligned radiation receiving segments $S_0, S_1, \ldots S_{n-1}, S_n$ with the radiation responsive output of each segment S being separately available. For purposes of illustration, n is selected as 256 to provide radiation receiving segments $S_0$ through $S_{255}$. As can be appreciated, more or less segments S can be utilized depending upon the ranging resolution desired. The photo responsive array 22 may be fabricated by mounting n separate sensing segments S on a planar surface or, more preferably, fabricating the photo array 22 as an integrated circuit element with the separately formed segments S deposited upon or otherwise formed on a unitary substrate during manufacture in accordance with conventional micro-electronic fabrication techniques. The photo-responsive array 22 is of the type that provides an output that is a function of or responsive to the incident infra-red radiation. The output may be photo voltaic, that is, the segments S generating a voltage output in response to the incident infra-red radiation, or photo conductive, that is, the segments S changing their conductivity in reponse to a change in the incident infra-red radiation. In the latter case, the radiation responsive photo conductivity is utilized with a reference power supply to provide a voltage responsive output signal. A commercially available photo-responsive sensor suitable for use with the present invention is a 'Reticon' manufactured by the Reticon Corporation of Mountain View, Calif.

A circuit for computing the distance-to-subject range is shown in functional block form in FIG. 3 and includes the photo responsive array 22 having the outputs from the individual photo-responsive segments $S_0$–$S_n$ connected to the parallel inputs of a Schmidt trigger array 26. The output of the Schmidt trigger array 26 is connected through a selectively actuated gate array 28 to the parallel-load inputs of a shift register 30. A timing and control circuit 32 that includes a clock 34, a counter 36, and a decoder 38 provides timing and control signals to enable the gate array 30 and increment the shift register 30. The clock 34 provides a recurring pulse output to the counter 36 which increments one count for each clock pulse. The counter 6 is configured to clear and recycle when a maximum count is reached. The parallel outputs of the counter 36 are connected to the input of the decoder 38 which provides the timing and control signals on a recurring, periodic basis in response to the cyclic operation of the counter 36. The serial output of the shift register 30 is connected to the enable/disable input of an address counter 40 with the input of the counter 40 connected to the output of the clock 34 through an NAND gate 42. The parallel outputs of the counter 40 are connected to an address register 44 which is connected to and adapted to address a memory 46 which may take the form of a ROM or PROM. As discussed in greater detail below, the memory 46 functions as a table-look-up with the individual memory locations containing distance-to-subject range information.

In operation, the camera operator aims the camera toward the scene to be photographed and frames the subject of principal interest in a designated area in the view finder 12. Radiation either emitted from or reflected from the subject of principal interest enters the ranging sensor 10 at an angle of incidence α that is a function of the distance-to-subject range. This radiation is diffracted in the diffraction device 18 with the optical characteristics, spacing, and positioning of the diffraction device 18 relative to the photo responsive array 22 arranged so that a selected one of the spectral lines, for example, the n=−1 maxima, falls on the radiation receiving surface 24 of the photo responsive array 22. The position that the spectral line falls on the photo responsive array 22, as discussed above in connection with FIGS. 2A and 2B, is a function of the distance of the subject from the camera. In the case of the photo responsive array 22 illustrated in FIG. 3, the spectral line at the position P' (cross-hatched) represents subjects relatively close to the camera, the spectral line at the position P" represents subjects at a greater distance, and the spectral line at the position P represents subjects at an intermediate range. The grating 18 characteristics are selected so that the width of the imaged spectral line is substantially narrower than the width of the individual photo responsive segments $S_n$.

When the circuit of FIG. 3 is enabled by application of a suitable signal to an enable line 48, the timing and control counter 36 is enabled to initiate its cycle. As the counter 36 cyclically counts in response to the clock 34 pulses, the decoder 38 is operative to provide selectively timed gating and control signals. In response to the signals from the decoder 38, the gate array 28 is enabled to pass the operational state of the photo responsive array 22 into the parallel load inputs of the shift register 30, this register being simultaneously enabled by a 'load' signal applied from the decoder 38. The Schmidt trigger array 26 operates in a conventional manner to provide an output signal of predetermined magnitude when one of its inputs increases beyond a threshold limit, thus functioning as a filter to prevent false triggering by background radiation. The contents of the shift register 30, after completion of this gate and load sequence, will be a binary word having, in the case of the preferred embodiment, 256 bit locations of which one of the bit locations will be a binary 1; that bit location corresponding to the position of the spectral line imaged on the photo-responsive array 22 and also corresponding to the distance-to-subject range. After the shift register 30 is loaded with the binary word that uniquely defines the position of the spectral line on the photo-responsive array 22, the NAND gate 42 is enabled to gate clock pulses from the clock 34 to the shift input of the shift register 30 to incrementally shift the contents of the shift register 30 along its serial output line 50 to the inhibit input of the counter 40. Substantially simultaneously with the shifting of the contents of the shift register 30, the clock 34 pulses are also provided through the enabled gate 42 to the count input of the counter 40. Accordingly, with each clock pulse, the contents of the shift register 30 are shifted by one bit position while the counter 40 increments one count. This shifting/counter-incrementing cycle continues until the binary 1 bit that corresponds to the location of the spectral line on the photo responsive array 22 is shifted out to inhibit the counter 40 which then contains a count that is a function of the relative position of the imaged spectral line on the photo sensitive array 22 and the distance-to-subject range. The counter 40 parallel outputs are provided to the address register 44 which then addresses a selected one of a plurality of memory locations in the memory 46. The so-accessed memory location contains empirically determined distance-to-subject range information whih is then accessed to provide the range indication. The memory contents of the memory 46 may be empirically determined based on the physical, geometric, and optical dimensions or characteristics of the camera and the ranging sensor 10. In the case of the spectral lines illustrated in FIG. 3 at the positions P", P, and P', the addressed location in the memory 46 will be lowest for the spectral line at the position P', highest for the spectral line at the position P", and in between for the spectral line at the position P. Since these spectral line locations correspond to different distance-to-subject ranges, as discussed above in connection with FIG. 2B, the contents of the individual memory locations can be readily and accurately determined.

Figure 4:
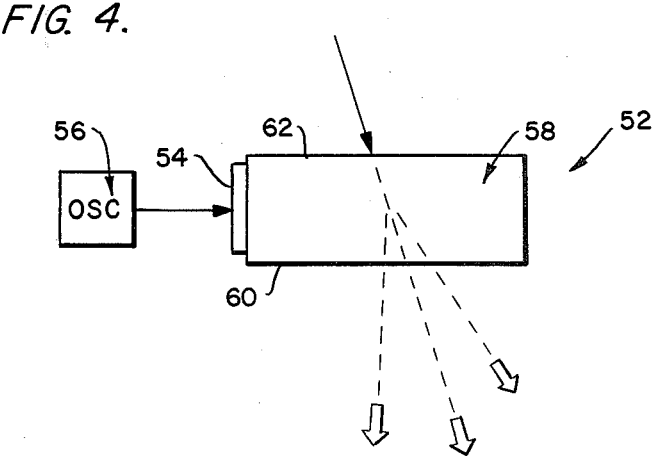
FIG. 4 is a schematic illustration of an alternate diffraction device in the form of an acousto/optical diffraction cell and associated excitation oscillator.

In the embodiment described above, a conventional transmission-type diffraction grating or replica is utilized to effect diffraction of the radiation from the subject of principal interest. Other types of diffraction devices may be utilized including the acousto/optical diffraction cell 52 illustrated in FIG. 4. The cell 52 includes a transducer 54 which receives excitation energy from an excitation source 56. The cell 52 includes a column of wave energy propagating media 58 constrained between two transparent plates 60 and 62. The transducer 54, in response to the excitation source, establishes recurring wave fronts in the media. Light incident on this so-excited media is diffracted to include zero and n order maximas in a manner analogous to conventional gratings. More detailed disclosure relating to the acousto/optical cell 52 may be had by reference to Bell Telephone System Monograph B-1654, by G. W. Willard, published in the Journal of the Acoustical Society of America, vol. 21, pp. 101–108, March 1949.

When the above described auto-ranging system is utilized in cooperation with a camera-mounted source of radiation (such as an infra-red light emitting diode) the operation of the system can be enhanced by modulating or otherwise encoding the radiation source output and providing circuitry to process the output of the photo responsive array 22 to discriminate the reflected ranging signal from background radiation. One manner of so modulating the radiation source is to chop or periodically interrupt the radiation source input at a selected repetition rate and to provide processing circuitry to pass a signal in the selected repetition rate range.

As can be appreciated by those skilled in the art, the above described auto ranging system permits higher resolution in making the distance-to-subject range determination when compared to prior systems. In some prior ranging systems, the image width of the subject focused on a photo responsive sensor is of the same order of magnitude as the physical width of the sensor. By way of contrast, the present system diffracts light energy from the subject and selects diffraction characteristics that provide relatively narrow, bright spectral lines which are imaged on the photo-responsive array to provide a subject-range-dependent image on the photo-responsive array that is at least an order of magnitude narrower than that in previous systems to thereby achieve an enhanced ranging resolution.

As is apparent to those skilled in the art, various changes and modifications may be made to the auto ranging system of the present invention without departing from the spirit and scope of the invention as recited in the appended claims and their legal equivalent.

What is claimed is:

1. A ranging system for a photographic camera for determining the distance-to-subject range, said system comprising:
   a ranging sensor mounted on a camera for receiving light energy from the subject of principal interest in the scene to be photographed at an angle of incidence that varies as a function of the distance-to-subject range, said ranging sensor including means for diffracting the light from the subject of principal interest into spectral lines and including photo-responsive means mounted relative to said diffraction means for receiving a selected one of said spectral lines which images on a radiation receiving face thereof, the relative position on said radiation receiving face that the selected spectral line images varying as a function of the angle of incidence of the light from the subject of principal interest, said photo-responsive means having n segments that each provide a signal output responsive to the light imaged thereon; and
   circuit means connected to the signal outputs of said n segments of said photo-responsive means for determining the relative position of the selected spectral line imaged on said radiation receiving face of said photo-responsive means and for determining the distance-to-subject range as a function of the so-determined relative position.

2. The auto ranging system claimed in claim 1 further comprising:
   an infra-red radiation source for irradiating the scene to be photographed, a portion of the irradiating energy being reflected from the subject of principal interest to said ranging sensor.

3. The ranging system claimed in claim 2 further comprising:
   filter means positioned relative to said diffraction means to pass only infra-red radiation from the subject of principal interest.

4. The ranging system claimed in claim 1 wherein a first order spectral line is the selected spectral line.

5. The ranging system claimed in claim 1 wherein said diffraction means comprises:
   a transmission-type diffraction grating having recurring grooves for effecting diffraction of light transmitted therethrough.

6. The auto ranging system claimed in claim 5 wherein said diffraction means comprises:
   a transmission-type diffraction replica for effecting diffraction of light transmitted therethrough.

7. The auto ranging system claimed in claim 1 wherein said diffraction means comprises:
   an acoustical/optical diffraction cell, a transducer connected to the cell, and an excitation means connected to said transducer to excite said cell to effect diffraction of light transmitted therethrough.

8. An improved auto ranging system for a photographic camera of the type having a view finder for framing a subject of principal interest in the scene to be photographed and a ranging sensor for receiving light from the subject of principal interest at an angle of incidence that is a function of the distance-to-subject range, the ranging sensor including means for imaging a portion of the so-received light on a photo responsive means so that the relative position of the so-imaged light on the photo responsive means is a function of the angle of incidence of the light from the subject and circuit means for determining the distance-to-subject range based on the relative position of the imaged light on the photo responsive means, the improvement comprising:
   a diffraction means positioned relative to said photo responsive means for diffracting the so-received light energy into spectral lines with a selected one of the spectral lines imaged on the photo responsive means so that the relative position of the imaged spectral line thereon is a function of the angle of incidence of the light from the subject of principal interest and the distance-to-subject range.

9. The improved auto ranging system claimed in claim 8 wherein said diffraction means comprises:
   a transmission-type diffraction grating having recurring grooves for effecting diffraction of light transmitted therethrough.

10. The improved auto ranging system claimed in claim 9 wherein said diffraction means comprises:
    a transmission-type diffraction replica for effecting diffraction of light transmitted therethrough.

11. The improved auto ranging system claimed in claim 8 where said diffraction means comprises:
    an acoustical/optical diffraction cell, a transducer connected to the cell, and an excitation means connected to said transducer to excite said cell to effect diffraction of light transmitted therethrough.

12. The improved auto ranging system claimed in claim 8 further comprising:
    filter means positioned relative to said diffraction means for passing only infra-red radiation from the subject of principal interest.

13. The improved auto ranging system claimed in claim 8 further comprising:
    an infra-red radiation source for irradiating the scene to be photographed, a portion of the irradiating energy being reflected from the subject of principal interest to said ranging sensor.

14. The improved auto ranging system claimed in claim 13 further comprising:
    filter means positioned relative to said diffraction means for passing only infra-red radiation reflected from the subject of principal interest.

15. An auto ranging system for a photographic camera or the like for determining the distance-to-subject range, said system comprising:
    a ranging sensor mounted on a camera for receiving light energy from the subject of principal interest in the scene to be photographed at an angle of incidence that varies as a function of the distance-to-subject range, said ranging sensor including means for diffracting the light from the subject into spectral lines and including photo responsive means mounted relative to said diffraction means for receiving one of the spectral lines which images on a radiation receiving face thereof, the relative position that the spectral line images on said radiation receiving face varying as a function of the angle of incidence of the light from the subject, said photo responsive means providing a signal output that is a function of said relative position that said spectral line images on said photo responsive means; and circuit means connected to said signal output of said photo responsive means for determining the distance-to-subject range as a function of said relative position of the imaged spectral line on the photo responsive means.

16. The auto ranging system claimed in claim 15 further comprising:

an infra-red radiation source for irradiating the scene to be photographed, a portion of the irradiating energy being reflected from the subject of principal interest to said ranging sensor.

17. The auto ranging system claimed in claim 16 further comprising:

filter means positioned relative to said diffraction means for passing only infra-red radiation from the subject of principal interest.

18. The auto ranging system claimed in claim 15 wherein a first order spectral line is said one spectral line.

19. The auto ranging system claimed in claim 15 wherein said diffraction means comprises:

a transmission-type diffraction grating having recurring grooves for effecting diffraction of light transmitted therethrough.

20. The auto ranging system claimed in claim 19 wherein said diffraction means comprises:

a transmission-type diffraction replica for effecting diffraction of light transmitted therethrough.

21. The auto ranging system claimed in claim 15 wherein said diffraction means comprises:

an acoustical/optical diffraction cell, a transducer connected to the cell, and an excitation means connected to said transducer to excite said cell to effect diffraction of light transmitted therethrough.

* * * * *